US011816070B2

(12) United States Patent
Weil et al.

(10) Patent No.: US 11,816,070 B2
(45) Date of Patent: Nov. 14, 2023

(54) FILESYSTEM PASS-THROUGH ON LIGHTWEIGHT VIRTUAL MACHINE CONTAINERS

(71) Applicant: Red Hat, Inc., Raleigh, NC (US)

(72) Inventors: Sage Weil, Madison, WI (US); Vincent Batts, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/717,568

(22) Filed: Apr. 11, 2022

(65) Prior Publication Data

US 2022/0237150 A1    Jul. 28, 2022

Related U.S. Application Data

(62) Division of application No. 16/015,876, filed on Jun. 22, 2018, now Pat. No. 11,301,428.

(51) Int. Cl.
*G06F 16/176* (2019.01)
*G06F 9/455* (2018.01)

(52) U.S. Cl.
CPC ........ *G06F 16/176* (2019.01); *G06F 9/45558* (2013.01); *G06F 2009/45579* (2013.01); *G06F 2009/45583* (2013.01)

(58) Field of Classification Search
CPC ............... G06F 16/176; G06F 9/45558; G06F 2009/45579; G06F 2009/45583; G06F 2009/45562; G06F 8/63; G06F 2009/4557; G06F 9/45533; G06F 2009/45587; G06F 16/188; G06F 11/1484; G06F 2201/815
See application file for complete search history.

(56) References Cited

U.S. PATENT DOCUMENTS

| 7,409,511 | B2   | 8/2008  | Edwards et al. |
|-----------|------|---------|----------------|
| 7,437,387 | B2 * | 10/2008 | Cohen ..................... G06F 16/10 711/6 |
| 9,075,638 | B2 * | 7/2015  | Barnett ............... G06F 9/45558 |
| 2004/0078568 | A1 | 4/2004 | Pham et al. |
| 2010/0235831 | A1 | 9/2010 | Dittmer |

(Continued)

OTHER PUBLICATIONS

R. Collins, T. Gelles, B. Marks, A. Simms and K. C. Webb, "STOIC: Streaming operating systems in the cloud," 2017 IEEE International Conference on Communications (ICC), Paris, France, May 21-25, 2017, pp. 1-6, doi: 10.1109/ICC.2017.7996824. (Year: 2017).*

(Continued)

*Primary Examiner* — Cheyne D Ly
(74) *Attorney, Agent, or Firm* — K&L Gates LLP

(57) ABSTRACT

An example method for filesystem pass-through on lightweight virtual machine containers includes executing a container on a host, and creating a file system overlay in a local file system storage located on the host. The example method further includes copying files and directories into the file system overlay from a shared file system until the file system overlay is fully populated. The file system overlay is fully populated when all the files and directories from the shared file system are copied into the file system overlay. Once fully populated, completion is marked which indicates the file system overlay is fully populated, where marking the completion prevents accessing a read-only base image within the shared file system.

20 Claims, 7 Drawing Sheets

(56) References Cited

U.S. PATENT DOCUMENTS

2017/0212830 A1* 7/2017 Thomas .............. G06F 11/3668
2017/0302734 A1 10/2017 Liang et al.
2018/0189121 A1 7/2018 Jobi et al.

OTHER PUBLICATIONS

Qiu, H., Managing bulk sensor data for heterogeneous distributed sensor systems, Northeastern University Boston, Massachusettsm, pp. 1-68. (Year: 2014).*

N. Mizusawa, J. Kon, Y. Seki, J. Tao and S. Yamaguchi, "Performance Improvement of File Operations on OverlayFS for Containers," 2018 IEEE International Conference on Smart Computing (SMARTCOMP), Taormina, Italy, 2018, pp. 297-302, doi: 10.1109/SMARTCOMP.2018.00019. (Year: 2018).* ip.com, Method and System for fast virtual image provisioning in cloud environment, IP.Com Prior Art Database Technical Disclosure, pp. 1-7. (Year: 2011).*

McClendon, D., Global File Systems Is Red Hat's GFS worthy of the name?, Term Paper, University of Kansas, School of Electrical Engineering and Computer Science, pp. 1-15. (Year: 2006).*

Janakiram MSV; Managing Persistence for Docker Containers; The New Stack; Sep. 23, 2016; (22 pages).

John Minnihan; Understanding the Docker Cache for Faster Builds; The New Stack; Jul. 16, 2014; (11 pages).

Harter, et al.; Slacker: Fast Distribution with Lazy Docker Containers; Proceedings of the 14th USENIX Conference on File and Storage Technologies (FAST '16); Feb. 22-25, 2016; Santa Clara, CA, USA; (16 pages).

Du, et al.; Cider: a Rapid Docker Container Deployment System Through Sharing Network Storage; Beihang University, Beijing, China; 2016; (8 pages).

* cited by examiner

FILESYSTEM PASS-THROUGH ON LIGHTWEIGHT VIRTUAL MACHINE CONTAINERS

CROSS REFERENCES TO RELATED APPLICATIONS

This application is a divisional of U.S. patent application Ser. No. 16/015,876, filed on Jun. 22, 2018, the entire contents of which are hereby incorporated by reference.

BACKGROUND

Computer systems may employ isolated guests such as virtual machines that communicate with physical devices. A virtual machine (VM) is a software implementation of a computer that executes programs in a way similar to a physical machine. The isolated guest may share underlying physical hardware resources between different components of the computer system. Virtualized systems allow multiple isolated guests to run on a single physical host, which allows flexibility and scalability offered by running services or applications on the isolated guests. For example, an isolated guest may perform tasks associated with the functions of physical devices or other resources on the computer system by sending and receiving data over a network.

A container may be a virtualized object similar to a virtual machine except that, typically, a container may not implement a guest operating system and may, for example, instead utilize a host operating system of a physical machine. One or more applications and/or utilities may execute in a container, a container may execute directly on physical hardware or on a virtual machine. A container may have one or more respective, filesystems, memory, devices, network ports, etc. for accessing the physical resources of the physical machine and other resources outside of the physical machine. Specific requests to access physical resources inside or outside of the physical machine may be made through the host operating system.

Typically, containers may be launched to provide extra compute capacity of a type that the container is designed to provide. Containers allow a programmer to quickly scale the deployment of applications to the volume of traffic requesting the applications. Containers may be deployed in a variety of hardware environments. To attempt to maximize the usage of computer hardware through parallel processing using virtualization, it may be advantageous to maximize the density of containers in a given hardware environment, for example, in a multi-tenant cloud.

SUMMARY

The present disclosure provides new and innovative methods and systems for filesystem pass-through on lightweight virtual machine containers. An example method includes executing a container on a host, and creating a file system overlay in a local file system storage located on the host. The example method further includes copying files and directories into the file system overlay from a shared file system until the file system overlay is fully populated. The file system overlay is fully populated when all the files and directories from the shared file system are copied into the file system overlay. Once fully populated, completion is marked which indicates the file system overlay is fully populated, where marking the completion prevents accessing a read-only base image within the shared file system.

An example system includes one or more processors, a shared file system, and a host executing on the one or more processors. The host is configured to execute a container, create a file system overlay in a local file system storage, and copy files and directories into the file system overlay from the shared file system until the file system overlay is fully populated. The file system overlay is fully populated when all of files and directories from the shared file system are copied into the file system overlay, and mark the completion of copying which indicates that the file system overlay is fully populated. Marking the completion of copying prevents accessing a read-only base image within the shared file system.

An example method includes detecting that a container image is published from a register, fetching the container image from an archive, and unpacking the container image onto a shared file system creating a read-only base image on the shared file system. The method further includes copying files and directories into a file system overlay from the shared file system until the file system overlay is fully populated, where the file system overlay is fully populated when all of the files and directories from the shared file system are copied into the file system overlay, and mark the completion of copying which indicates that the file system overlay is fully populated. Marking the completion of copying prevents accessing the read-only base image within the shared file system.

Additional features and advantages of the disclosed methods and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Generally, a cluster may be a set of loosely or tightly connected computers or hosts that work together so that they can be viewed as a single system. In some cases, clusters may have each host set to perform the same task, controlled and scheduled by software. Hosts are usually connected to each other through fast local area networks, with each host typically running its own instance of an operating system. Clusters are typically deployed to improve performance and availability over that of a single computer, while typically being much more cost-effective than single computers of comparable speed or availability.

Typically, before hosts within a cluster can run a container, each host must download a container image of the container before the container can be launched at each host. This may be redundant and expensive as container images may be large, and fetching container images to store and unpack on each host may cause startup latency. One possible solution may be to put the desired container image onto a shared file system. Generally, a shared file system allows multiple hosts to access the same container image at the same time. With shared file systems, once a file system is mounted by a participating system, that file system is accessible by any other participating system. However, although this approach may mitigate startup latency, it introduces a single point of failure in the system, since if any problems exist with the shared file system, then all running containers utilizing the images stored there will break.

The present disclosure provides a possible solution to this problem. For example, when a container image is published, the layers of the image may be extracted onto a shared file system to be utilized by any hosts utilizing the shared file system. When a container is started on a particular host for the first time, the host may create a local overlay in a cache or local file system memory. The host may immediately be able to run the container, as operations may fall through to the base container image located on the shared file system. However, the contents of the base container image may be asynchronously copied into the cache simultaneously while the container is running. Once fully copied, a marking may indicate the contents of the base container image are fully copied and operations may no longer fall through to the base image located on the shared file system. In the example, start up latency may be minimized and/or non-existent as initially no data needs to be copied in order for the host to execute the container. Further, a centralized point of failure may exist for only for a minimal amount of time (e.g., a few seconds) as eventually all the files and directories stored in the shared file system may be copied into a cache of the host running the container.

Figure 1:
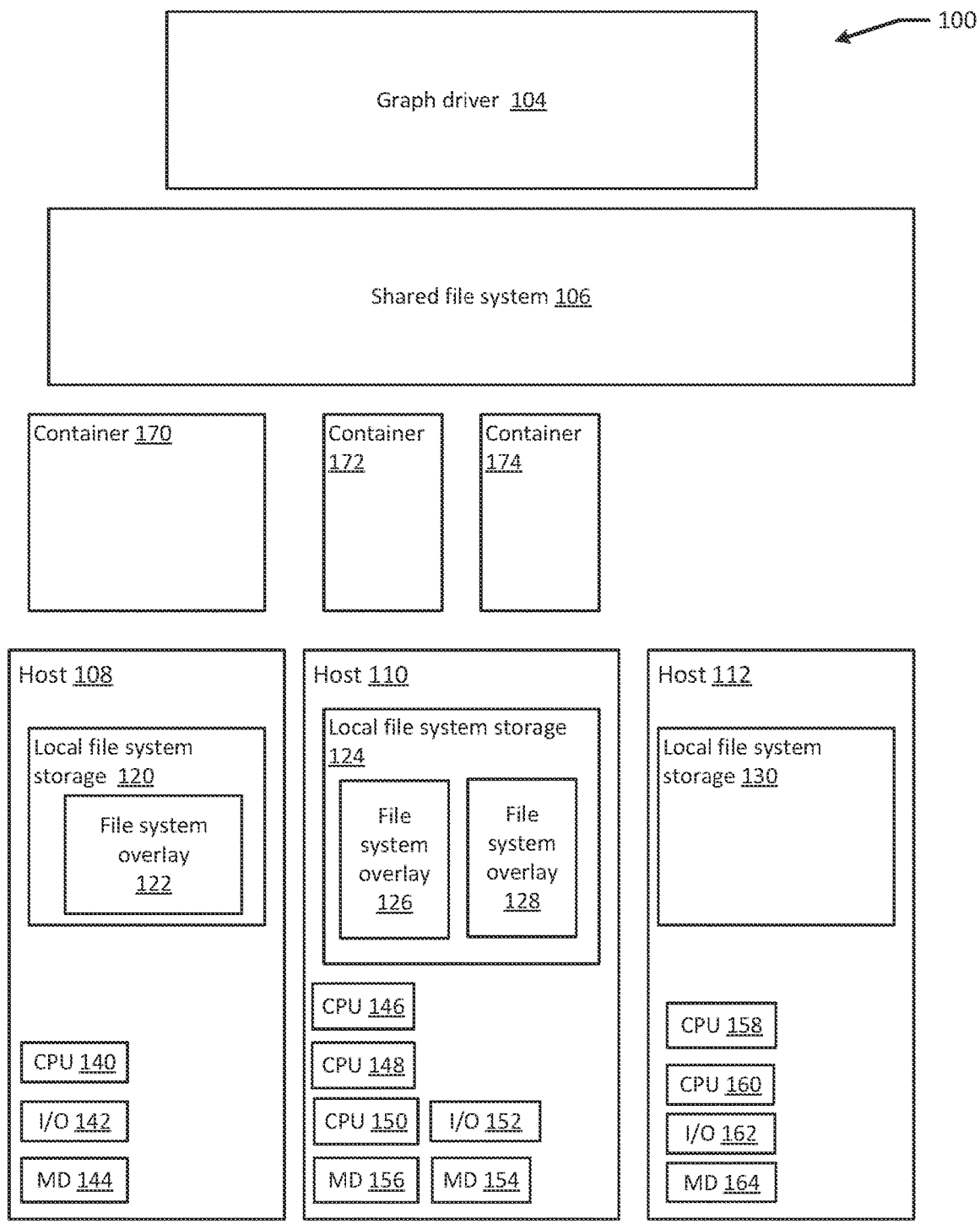
FIG. 1 is a block diagram of an example system according to an example of the present disclosure.

FIG. 1 depicts a high-level component diagram of an example system 100 for filesystem pass-through on lightweight virtual machine containers. For example, the system 100 may include hosts 108, 110, and 112. Host 108 may include a local file system storage 120, a CPU 140, an input/output device ("I/O") 142, and a memory device ("M/D") 144. The local file system storage 120 may also be referred to as a local file system memory. The local file system storage 120 may include a file system overlay 122. Typically, for example, OverlayFS, which is a Linux™ filesystem, is used. The file system overlay 122 is a writeable layer. The host 110 may include a local file system storage 124, CPUs 146, 148, 150, I/O device 152, and memory devices 154 and 156. The local file system storage 124 may include file system overlays 126 and 128. The host 112 may include a local file system storage 130, CPUs 158 and 160, I/O device 162, and memory device 164. The system 100 also may include a graph driver 104, a shared file system 106, and containers 170, 172, and 174. In an example, graph driver 104 may execute on any of or all of hosts 108, 110, 112. In an example, a container may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod).

In an example, when a host 108, 110, 112 needs to execute a container 170, 172, or 174, the graph driver 104 may direct a host 108, 110, 112 to create a file system overlay 122, 126, 128 within a local file system storage 120, 124, 130. For example, local file system storage 130 in host 112 may not include a file system overlay because host 112 may not have run any of containers 170, 172, or 174. Further, host 108 may include file system overlay 122 as host 108 may have run container 170. Even further, host 110 may include both file system overlay 126 and 128 because host 110 may have run both containers 172 and 174.

In an example, each container instantiation may receive its own file system overlay in a local file system storage. Therefore, in an alternate example, host 110 may have needed to run container 172 twice, and therefore, both file system overlays 126 and 128 may correspond to the instantiations of container 172. Accordingly, in the alternate example, for every container instantiation by a host, an overlay layer is created for each container instantiation. In another example, all of the containers 170, 174, and may be based on copies of the same container image.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

Further, system 100 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.). For example, the I/O devices 142, 152, 162 may be coupled to a processor.

Figure 2:
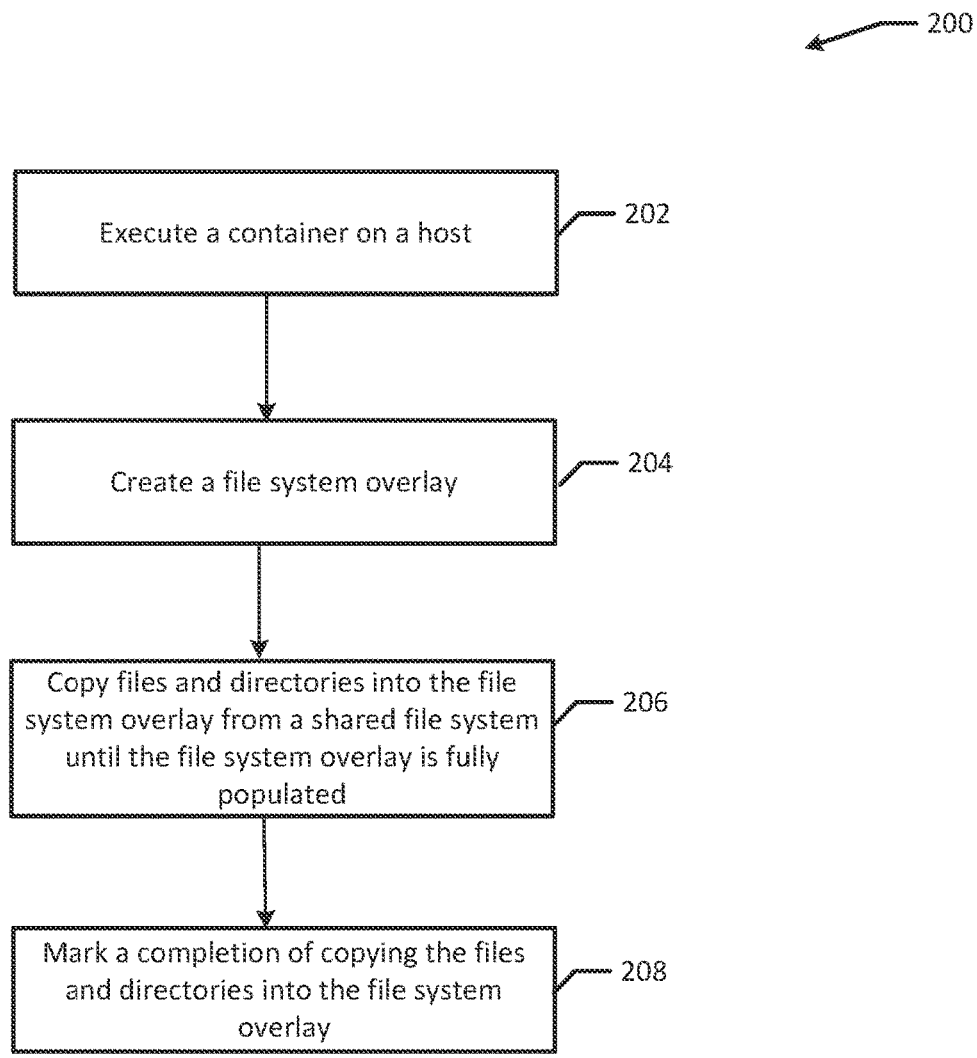
FIG. 2 is a flowchart illustrating an example method for filesystem pass-through on lightweight virtual machine containers according to an example of the present disclosure.

FIG. 2 is a flowchart illustrating an example method 200 for filesystem pass-through on lightweight virtual machine containers. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

The example method 200 may begin with executing a container on a host (block 202). For example, the container 170 illustrated in FIG. 1 may be executed on the host 108.

Next, a file system overlay is created (block 204). For example, the file system overlay 122 is created on host 108 in the local file system storage 120. In the example, the system 100 may now begin running the container 170 on host 108 immediately following the creation of file system overlay 122. The local file system storage 120 may be any type of storage or memory, including, for example, a hard disk or SSD. In an example, the file system overlay 122 may be created by the graph driver 104.

Next, files and directories are copied into the file system overly from a shared file system until the file system overlay is fully populated (block 206). For example, an image of the container 170 was published, the files and directories of that container image were extracted into the shared file system 106 by graph driver 104. These files and directories stored in shared file system 106 may be asynchronously copied into file system overlay 122 while the container 170 executes. File system overlay 122 may be fully populated when all the files and directories stored in shared file system 106 are copied into file system overlay 122. Copying may be a background process and may occur via lazy loading, immediately upon creating the file system overlay 122 at a low or slow rate, immediately upon creating the file system overlay 122 at a quick rate, or on-demand. On-demand may be at the request of a user or administrator.

Then, the copying of the files and directories into the file system overlay is marked as completed (block 208). For example, once the copying of the files and directories into file system overlay 122 from shared file system 106 is completed, either the file system overlay 122 or graph driver 104 will be marked to indicate copying is completed. This marking may be performed by the graph driver 104. In an example, the marking may be a flag. Once copying is marked as completed, indicating the file system overlay may be fully populated, operations (e.g., readdir and lookup operations) may not fall through to the read-only base image stored on the shared file system 106. Rather, any operations may be processed by the file system overlay 122.

Typically, there will be many files and directories copied into the shared file system 106 that are based on the contents of container 170. In an alternate example, as copying of each directory or file is completed, marking may be performed on each individual file or directory, or in the graph driver 104 indicating each file or directory, and marking need not wait until the entirety of the files and directories associated with the container 170 have been copied into file system overlay 122 from shared file system 106. For example, marking may occur for each directory when an entire directory with all associated files is completed.

Figure 3:
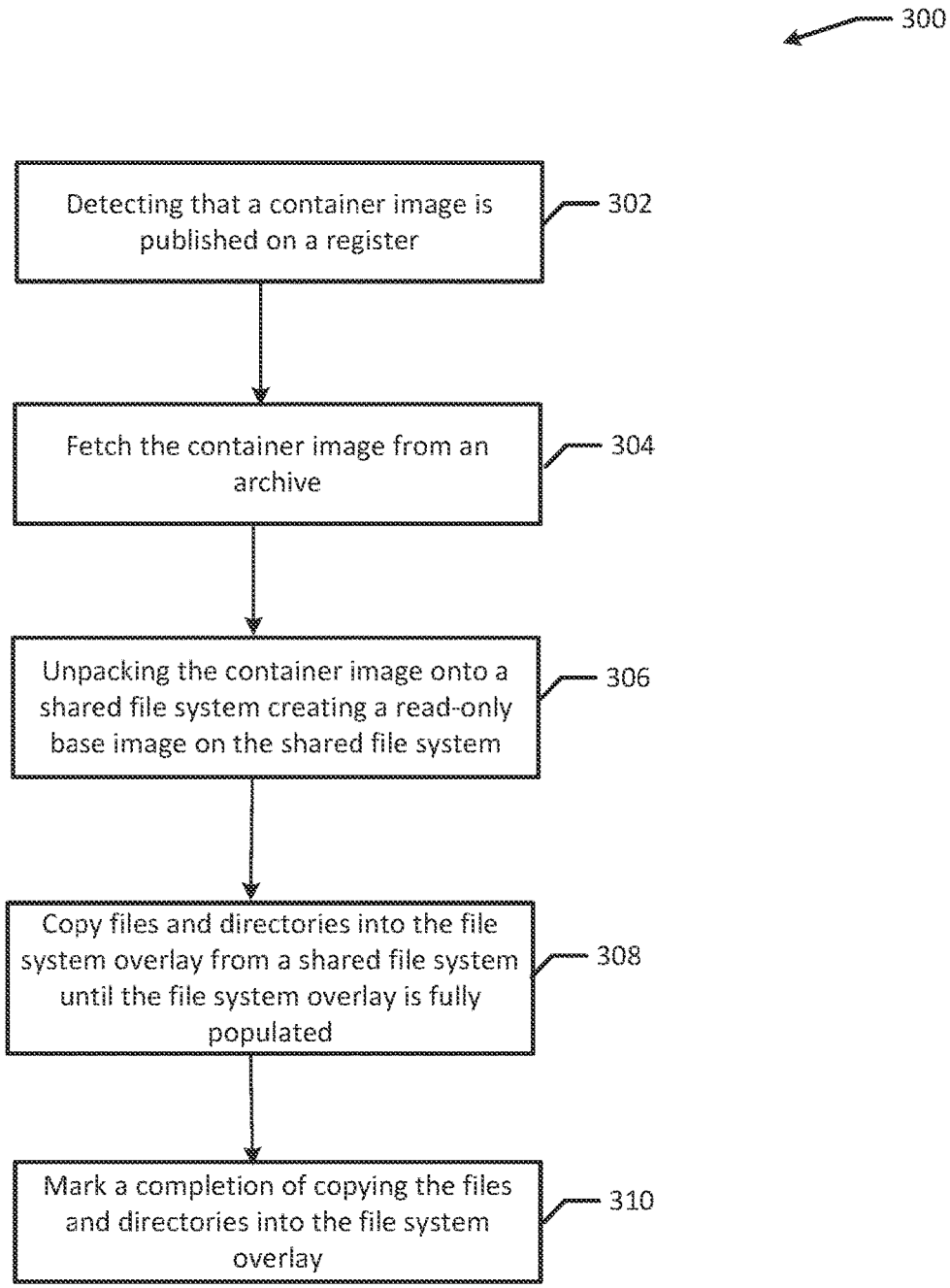
FIG. 3 is a flowchart illustrating an example method for filesystem pass-through on lightweight virtual machine containers according to an example of the present disclosure.

FIG. 3 is a flowchart illustrating an example method 300 for filesystem pass-through on lightweight virtual machine containers. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The example method 300 begins by detecting that a container image is published (block 302). For example, the graph driver 104 in FIG. 1 may detect that a container image is published on a register. In an alternate example, the graph driver 104 may be notified that a new container image has been published.

Next, the example method 300 includes fetching the container image from an archive (block 304). For example, the graph driver 104 may fetch the container image from an archive based on detecting that the container image was published in the register.

Next, the container image may be unpacked onto a shared file system creating a read-only base image on the shared file system (block 306). For example, the graph driver 104 may unpack, extract, or un-TAR an image of the container 170 into shared file system 106, creating a read-only base image on the shared file system 106. The base image, being read-only, may not be manipulated. At this point, the host 108 may decide to run container 170, and the host 108 may run the container 170 without delay by utilizing the unpacked/extracted files located on shared file system 106. In the example, once the host 108 runs container 170, the file system overlay 122 will be created, and initially the file system overlay 122 is empty, and therefore all operations fall through to the read-only base image located on shared file system 106.

Next, files and directories may be copied into a file system overlay from the shared file system until the file system overlay is fully populated (block 308). For example, as the container 170 is being executed or is capable of being executed, the files and/or directories located in shared file system 106 may be copied into the file system overlay 122 in the background until fully populated.

Then, copying the files and directories into the file system overlay is marked as completed (block 310). For example, once all the files and directories associated with container 170 are copied from shared file system 106 into file system overlay 122, a marking may indicate that the file system overlay 122 is fully populated or that copying is completed. The marking may occur in the graph driver 104, for example in the graph driver 104's metadata, or the file system overlay 122. The marking may be a flag. The flag indicates the file system overlay 122 is fully populated and prevents accessing the read-only base image within the shared file system 106.

In the example, when the system 300 is restarted, the flag indicates to the graph driver 104 to skip a bind mount with the read-only base image, and utilize only the file system overlay 122 in the local file system storage 120. Therefore, on restart, the system 300 may skip communicating with the central server/shared file system 106, and therefore skip mounting the shared file system 106 which may advantageously reduce restart latency and increase robustness of the system by eliminating a possible single point of failure.

Figure 4A:
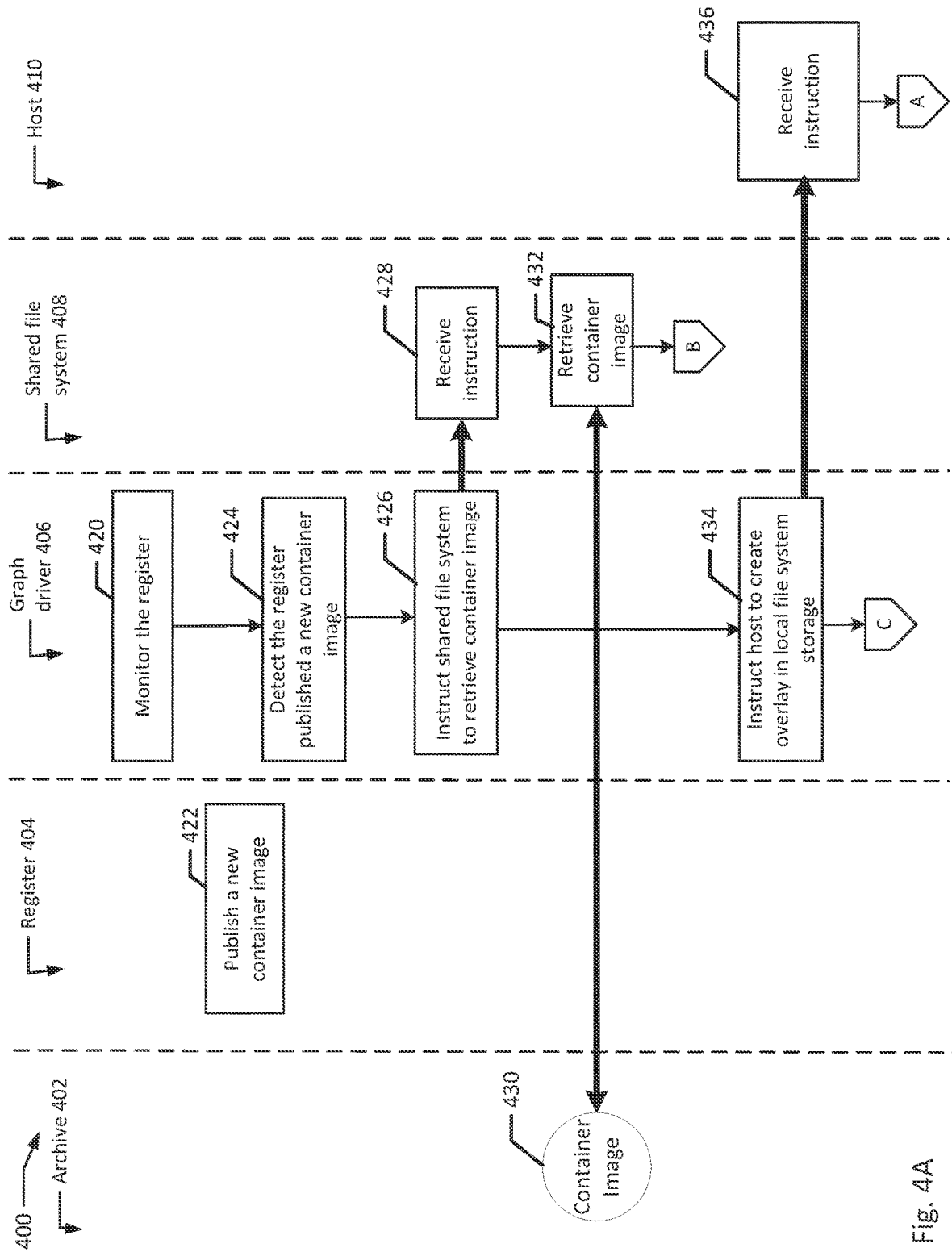
FIGS. 4A to 4B are a flow diagram illustrating example methods of filesystem pass-through on lightweight virtual machine containers according to an example of the present disclosure.
Figure 4B:
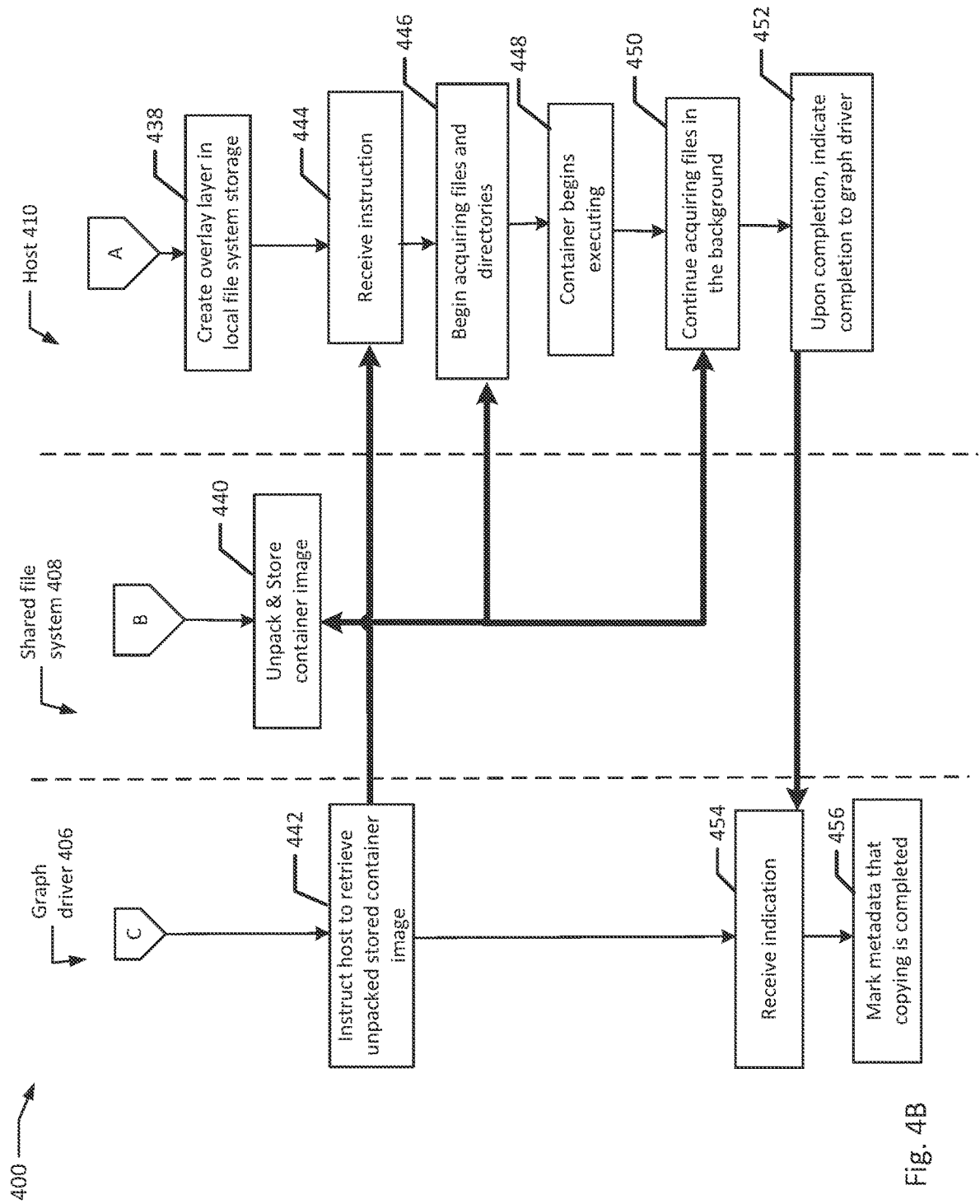

FIGS. 4A to 4B illustrate a flowchart of an example method 400 for filesystem pass-through on lightweight virtual machine containers. Although the example method 400 is described with reference to the flowchart illustrated in FIGS. 4A to 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including an archive 402, a register 404, a graph driver 406, a shared file system 408, and a host 410

In the illustrated example, the graph driver 406 monitors the register 404 (block 420). When the register 404 publishes a new container image (block 422), this is detected by the graph driver 406 (block 424), and the graph driver 406 instructs a shared file system 408 to retrieve the container image 430 (block 426). In an alternate example, the graph driver 406 itself may retrieve or fetch the container image 430. In the example, the instruction is received by the shared file system 408 (block 428), and the shared file system 408 retrieves or receives the container image 430 from archive 402 (block 432).

Next, the graph driver 406 instructs the host 410 to create a file system overlay in a local file system storage (block 434). The host 410 may receive this instruction from the graph driver 406 (block 436), and may create the file system overlay layer in the local file system storage on host 410 (block 438). The shared file system 408 may unpack and store the container image 430 (block 440). In an alternate example, the graph driver 406 may instruct the shared file system 408 to perform block 440. In an alternate example, the graph driver 406 may unpack the container image 430, creating the read-only base image which is then stored on shared file system 408. In an alternate example, the container image 430 is unpacked by an alternate host, and then the graph driver 406 or the shared file system 408 stores the unpacked container image onto the shared file system 408 from the alternate host. In the example, the container image 430 is not stored onto the shared file system 408, rather, the extracted or unpacked container image is stored onto shared file system 408 for use by the system 400.

Next, the graph driver 406 instructs the host 410 to retrieve the unpacked and stored container image (block 442). The host 410 receives the instruction (block 444), and begins acquiring files and/or directories (block 446). Either simultaneously with the creation of the overlay layer or consecutively, the container may begin executing on the host 410 (block 448). As the container is executing, the host 410 continues to acquire files in the background from the shared file system 408 (block 450). Once all the files and/or directories have been acquired from the shared file system 408, completion is indicated to the graph driver 406 (block 452). The graph driver 406 receives this indication from the host 410 (block 454), and marks its own metadata with a flag to indicate that copying is complete (block 456). In an alternate example, the graph driver 406 may not use a flag, but may use some other marking, or modification to indicate that copying is complete. In the example, the flag or marking is used to modify the overlay layer in order to indicate that operations should not drop to the read-only base image.

Figure 5:
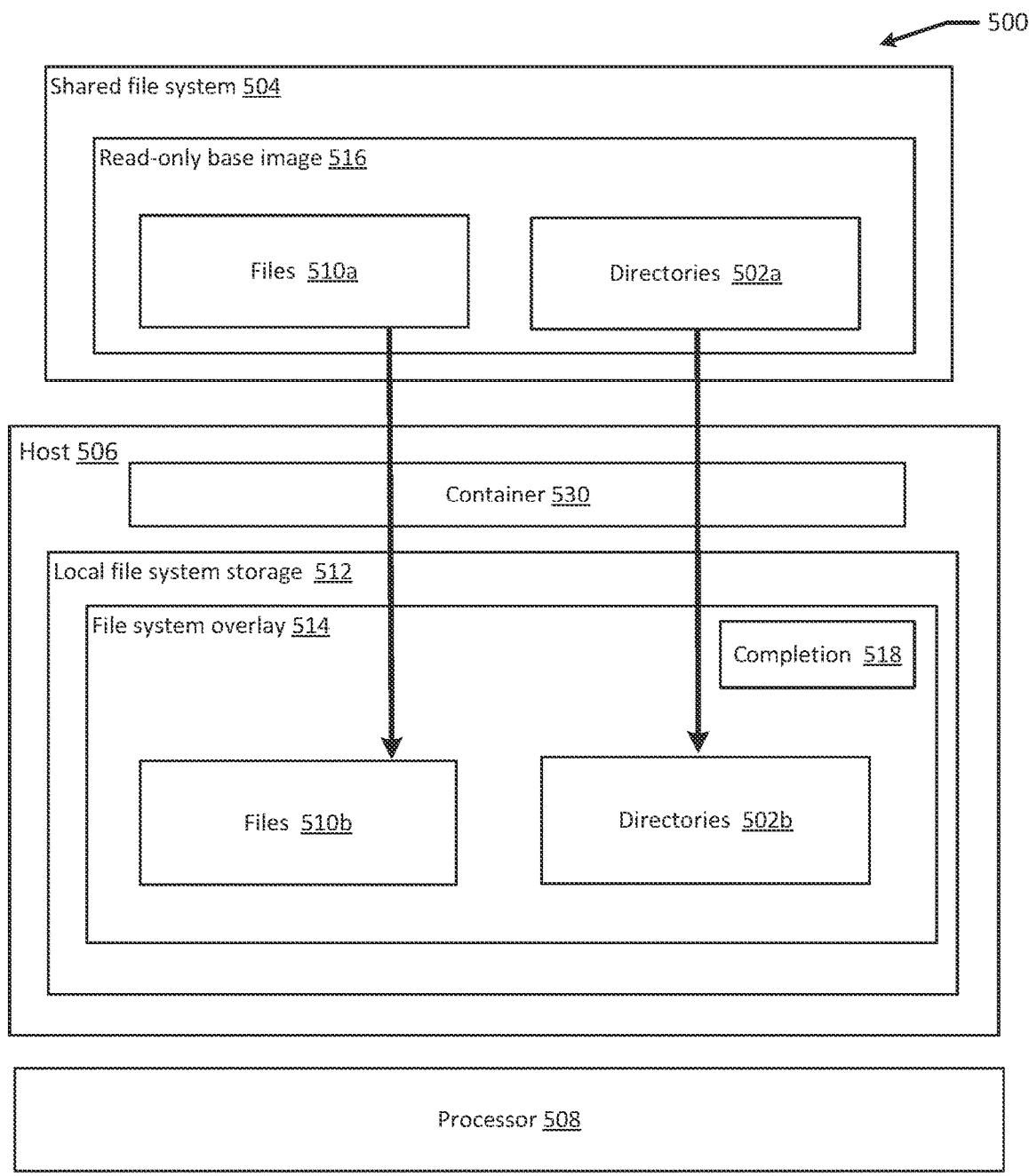
FIG. 5 is a block diagram of a system according to an example of the present disclosure.

FIG. 5 is a block diagram of an example system 500 according to an example of the present disclosure. As illustrated in FIG. 5, an example system 500 may include a shared file system 504 a host 506, and a processor 508. The shard file system 504 includes a read-only base image 516 that includes files 510a and directories 502a. The host 506 includes a container 530 and a local file storage system 512. The local file system storage 512 includes a file system overlay 514, which has copied into it files 510b and directories 502b. File system overlay 514 also includes a completion indication 518.

In the example, the files 510a and directories 502a are stored as the read-only base image 516 in shared file system 504. When the host 506 runs a container 530, a file system overlay 514 is created in the local file system storage 512.

In the background files 510a and directories 502a are copied into the file system overlay 514 as files 510b and directories 502b. These files 510b and directories 502b may originally be identical to files 510a and directories 502a, however, the file system overlay 514 is a writeable layer and over time the files 510b and directories 502b may change due to updates or modifications to the containers being run. Once copying is completed, a flag such as completion 518 may be marked in the file system overlay 514.

Figure 6:
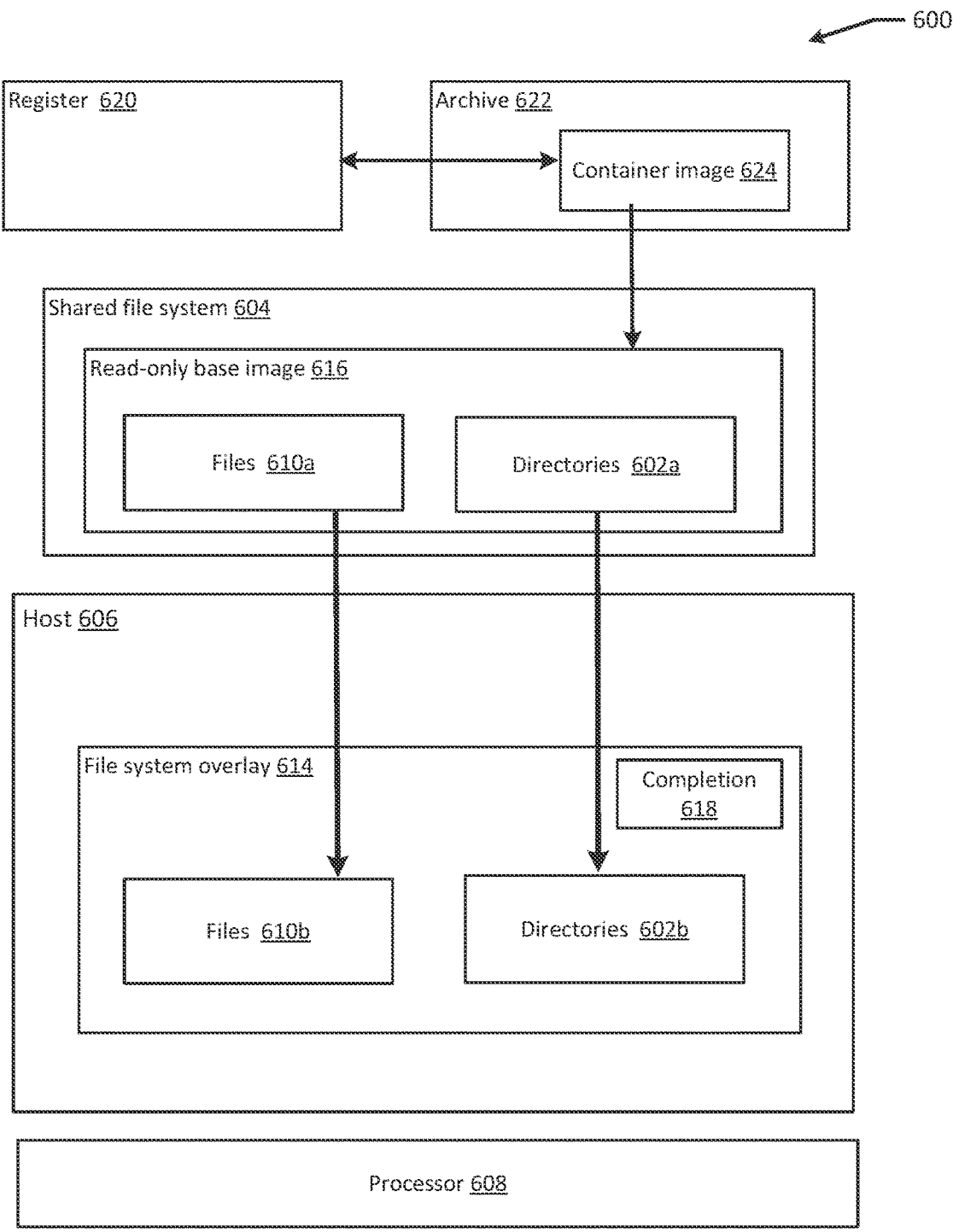
FIG. 6 is a block diagram of a system according to an example of the present disclosure.

FIG. 6 is a block diagram of an example system 600 according to an example of the present disclosure. The example system 600 may include a shared file system 604, a host 606, and a processor 608. The shard file system 604 includes a read-only base image 616 that includes files 610a and directories 602a. The host 606 includes a file system overlay 614, which has copied into it files 610b and directories 602b. File system overlay 614 also includes a completion indication 618. The system 600 also includes a register 620 and an archive 622. The archive 622 includes and container image 624.

The register publishes container image 624, that it retrieves or receives from archive 622. The container image 624 is extracted/unpacked and stored on shared file system 604 as read only base image 616 that includes the files 610a and directories 602a.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a method of mitigating start-up latency in a cluster system includes executing a container on a host; creating a file system overlay in a local file system storage located on the host; coping files and directories into the file system overlay from a shared file system until the file system overlay is fully populated, where the file system overlay is fully populated when all of the files and directories from the shared file system are copied into the file system overlay; and marking a completion that indicates the file system overlay is fully populated, where marking the completion that indicates the file system overlay is fully populated prevents accessing a read-only base image within the shared file system.

In accordance with a 2nd exemplary aspect of the present disclosure, which may be used in combination with any one or more of the preceding aspects (e.g., the 1st aspect), where the read-only base image is an extracted container file.

In accordance with a 3rd exemplary aspect of the present disclosure, which may be used in combination with any one or more of the preceding aspects (e.g., the 2nd aspect), where the extracted container file is an unpacked container image.

In accordance with a 4th exemplary aspect of the present disclosure, which may be used in combination with any one or more of the preceding aspects (e.g., the 1st aspect), where a graph driver creates the file system overlay, and marks the completion that indicates the file system overlay is fully populated.

In accordance with a 5th exemplary aspect of the present disclosure, which may be used in combination with any one or more of the preceding aspects (e.g., the 4th aspect), where marking the completion that indicates the file system overlay is fully populated includes marking a flag.

In accordance with a 6th exemplary aspect of the present disclosure, which may be used in combination with any one or more of the preceding aspects (e.g., the 5th aspect), where the flag is stored in the graph driver's metadata.

In accordance with a 7th exemplary aspect of the present disclosure, which may be used in combination with any one or more of the preceding aspects (e.g., the 5th aspect), where the flag is stored in the file system overlay.

In accordance with an 8th exemplary aspect of the present disclosure, which may be used in combination with any one or more of the preceding aspects (e.g., the 5th aspect), where upon restarting the cluster system, the flag indicates to the graph driver to skip a bind mount with the read-only base image.

In accordance with a 9th exemplary aspect of the present disclosure, which may be used in combination with any one or more of the preceding aspects (e.g., the 8th aspect), where upon restart only the file system overlay in the local file system storage is utilized.

In accordance with a 10th exemplary aspect of the present disclosure, which may be used in combination with any one or more of the preceding aspects (e.g., the 1st aspect), where a graph driver directs the shared file system to store the read-only base image.

In accordance with a 11th exemplary aspect of the present disclosure, which may be used in combination with any one or more of the preceding aspects (e.g., the 1st aspect), where the file system overlay is a writeable layer.

In accordance with a 12th exemplary aspect of the present disclosure, which may be used in combination with any one or more of the preceding aspects (e.g., the 1st aspect), where the host runs a plurality of container instances, and a respective overlay layer is created for each of the plurality of container instances.

In accordance with a 13th exemplary aspect of the present disclosure, which may be used in combination with any one or more of the preceding aspects (e.g., the 1st aspect), where upon creating the file system overlay, the file system overlay is empty and all operations fall through to the read-only base image.

In accordance with a 14th exemplary aspect of the present disclosure, which may be used in combination with any one or more of the preceding aspects (e.g., the 1st aspect), where copying the plurality of files and the plurality of directories from the shared file system is a background process.

In accordance with a 15th exemplary aspect of the present disclosure, which may be used in combination with any one or more of the preceding aspects (e.g., the 14th aspect), where copying the plurality of files and the plurality of directories from the shared file system occurs via lazy loading.

In accordance with a 16th exemplary aspect of the present disclosure, which may be used in combination with any one or more of the preceding aspects (e.g., the 14th aspect), where copying the plurality of files and the plurality of directories from the shared file system occurs immediately upon creating the file system overlay at a low rate.

In accordance with a 17th exemplary aspect of the present disclosure, which may be used in combination with any one or more of the preceding aspects (e.g., the 14th aspect), where copying the plurality of files and the plurality of directories from the shared file system occurs immediately upon creating the file system overlay at a quick rate.

In accordance with an 18th exemplary aspect of the present disclosure, which may be used in combination with any one or more of the preceding aspects (e.g., the 14th aspect), where copying the plurality of files and the plurality of directories from the shared file system occurs on-demand.

Aspects of the subject matter described herein may be useful alone or in combination with one or more other aspects described herein. In a 19th exemplary aspect of the present disclosure a system includes one or more processors, a shared file system, and a host. The host executes a container, creates a file system overlay in a local file system storage located on the host, copies files and directories into the file system overlay from the shared file system until the file system overlay is fully populated, where the file system overlay is fully populated when all of the files and directories from the shared file system are copied into the file system overlay, and marks a completion that indicates the file system overlay is fully populated, where marking the completion that indicates the file system overlay is fully populated prevents accessing a read-only base image within the shared file system.

Aspects of the subject matter described herein may be useful alone or in combination with one or more other aspects described herein. In a 20th exemplary aspect of the present disclosure a non-transitory machine-readable medium stores code, which when executed by a processor, is configured to execute a container on a host; create a file system overlay in a local file system storage located on the host; copy files and directories into the file system overlay from a shared file system until the file system overlay is fully populated, where the file system overlay is fully populated when all of the plurality of files and the plurality of directories from the shared file system are copied into the file system overlay; and mark a completion that indicates the file system overlay is fully populated, where marking the completion indicates the file system overlay is fully populated prevents accessing a read-only base image within the shared file system.

Aspects of the subject matter described herein may be useful alone or in combination with one or more other aspects described herein. In a 21st exemplary aspect of the present disclosure a method of mitigating start-up latency in a cluster system includes a means for executing a container on a host; a means for creating, in a local file system storage located on the host, a file system overlay; a means for copying files and directories into the file system overlay from a shared file system until the file system overlay is fully populated, where the file system overlay is fully populated when all of the plurality of files and the plurality of directories from the shared file system are copied into the file system overlay; and a means for marking a completion that indicates the file system overlay is fully populated, where marking the completion that indicates the file system overlay is fully populated prevents accessing a read-only base image within the shared file system.

Aspects of the subject matter described herein may be useful alone or in combination with one or more other aspects described herein. In a 22nd exemplary aspect of the present disclosure a method of mitigating start-up latency in a cluster system includes detecting that a container is published from a register; fetching the container image from an archive; unpacking the container image onto a shared file system creating a read-only base image on the shared file system; copying files and directories into a file system overlay from the shared file system until the file system overlay is fully populated, where the file system overlay is fully populated when all of the files and directories from the shared file system are copied into the file system overlay; and marking a completion that indicates the file system overlay is fully populated, where marking the completion that indicates the file system overlay is fully populated prevents accessing the read-only base image within the shared file system.

In accordance with a 23rd exemplary aspect of the present disclosure, which may be used in combination with any one or more of the preceding aspects (e.g., the 22nd aspect), where marking the completion that indicates the file system overlay is fully populated includes marking a flag.

In accordance with a 24th exemplary aspect of the present disclosure, which may be used in combination with any one or more of the preceding aspects (e.g., the 23rd aspect), where the flag is stored in a graph driver's metadata.

In accordance with a 25th exemplary aspect of the present disclosure, which may be used in combination with any one or more of the preceding aspects (e.g., the 23rd aspect), where the flag is stored in the file system overlay.

In accordance with a 26th exemplary aspect of the present disclosure, which may be used in combination with any one or more of the preceding aspects (e.g., the 23rd aspect), where upon restarting the cluster system, the flag indicates to the graph driver to skip a bind mount with the read-only base image.

In accordance with a 27th exemplary aspect of the present disclosure, which may be used in combination with any one or more of the preceding aspects (e.g., the 26th aspect), where upon restart only the file system overlay is utilized.

In accordance with a 28th exemplary aspect of the present disclosure, which may be used in combination with any one or more of the preceding aspects (e.g., the 22nd aspect), where the container image in unpacked in an alternate host, and the read-only base image is transferred from the alternate host to the shared file system.

In accordance with a 29th exemplary aspect of the present disclosure, which may be used in combination with any one or more of the preceding aspects (e.g., the 22nd aspect), where the read-only base image is an extracted container file.

In accordance with a 30th exemplary aspect of the present disclosure, which may be used in combination with any one or more of the preceding aspects (e.g., the 22nd aspect), where a graph driver fetches the container image, unpacks the container image creating the read-only base image, and directs the shared file system to store the files of the read-only base image.

In accordance with a 31st exemplary aspect of the present disclosure, which may be used in combination with any one or more of the preceding aspects (e.g., the 22nd aspect), where the file system overlay is a writeable layer.

In accordance with a 32nd exemplary aspect of the present disclosure, which may be used in combination with any one or more of the preceding aspects (e.g., the 22nd aspect), where upon creating the file system overlay, the file system overlay is empty and all operations fall through to the read-only base image.

In accordance with a 33rd exemplary aspect of the present disclosure, which may be used in combination with any one or more of the preceding aspects (e.g., the 22nd aspect), where copying the plurality of files and the plurality of directories from the shared file system is a background process.

In accordance with a 34th exemplary aspect of the present disclosure, which may be used in combination with any one or more of the preceding aspects (e.g., the 33rd aspect), where copying the plurality of files and the plurality of directories from the shared file system occurs via lazy loading.

In accordance with a 35th exemplary aspect of the present disclosure, which may be used in combination with any one or more of the preceding aspects (e.g., the 33rd aspect), where copying the plurality of files and the plurality of directories from the shared file system occurs immediately upon creating the file system overlay at a low rate.

In accordance with a 36th exemplary aspect of the present disclosure, which may be used in combination with any one or more of the preceding aspects (e.g., the 33rd aspect), where copying the plurality of files and the plurality of directories from the shared file system occurs immediately upon creating the file system overlay at a quick rate.

In accordance with a 37th exemplary aspect of the present disclosure, which may be used in combination with any one or more of the preceding aspects (e.g., the 33rd aspect), where the copying the plurality of files and the plurality of directories from the shared file system occurs on-demand.

Aspects of the subject matter described herein may be useful alone or in combination with one or more other aspects described herein. In a 38th exemplary aspect of the present disclosure a system includes one or more processors, a host, and a shared file system. The shared file system, when executing on the one or more processors, is configured to detect, from a register, that a container image is published; fetch, from an archive, the container image; unpack the container image onto the shared file system creating a read-only base image on the shared file system; copy files and directories into a file system overlay from the shared file system until the file system overlay is fully populated, wherein the file system overlay is fully populated when all of the files and the directories from the shared file system are copied into the file system overlay; and mark a completion that indicates the file system overlay is fully populated, where marking the completion that indicates the file system overlay is fully populated prevents accessing the read-only base image within the shared file system.

Aspects of the subject matter described herein may be useful alone or in combination with one or more other aspects described herein. In a 39th exemplary aspect of the present disclosure a non-transitory machine-readable medium stores code, which when executed by a processor, is configured to detect, from a register, that a container image is published; fetch, from an archive, the container image; unpack the container image onto a shared file system creating a read-only base image on the shared file system; store the read-only base image on a shared file system, copy files and directories into a file system overlay from the shared file system until the file system overlay is fully populated, wherein the file system overlay is fully populated when all of the files and directories from the shared file system are copied into the file system overlay; and mark a completion that indicates the file system overlay is fully populated, where marking the completion that indicates the file system overlay is fully populated prevents accessing the read-only base image within the shared file system.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   detecting, from a register, that a container image is published;
   fetching, from an archive, the container image;
   unpacking the container image onto a physical memory of a shared file system creating a read-only base image on the shared file system;
   copying, by a host, a plurality of files and a plurality of directories into a file system overlay from the shared file system until the file system overlay is fully populated, wherein the file system overlay is fully populated when all of the plurality of files and the plurality of directories from the shared file system are copied into the file system overlay; and
   marking a completion that indicates the file system overlay is fully populated, wherein marking the completion that indicates the file system overlay is fully populated prevents accessing the read-only base image on the shared file system.

2. The method of claim 1, wherein marking the completion that indicates the file system overlay is fully populated includes marking a flag.

3. The method of claim 2, wherein the flag is stored in a graph driver's metadata.

4. The method of claim 2, wherein the flag is stored in the file system overlay.

5. The method of claim 2, wherein upon restarting a cluster system which includes the host, the flag indicates to a graph driver to skip a bind mount with the read-only base image.

6. The method of claim 5, wherein upon restart only the file system overlay is utilized.

7. The method of claim 1, wherein the container image was unpacked in an alternate host, and the read-only base image was transferred from the alternate host to the shared file system.

8. The method of claim 1, wherein the read-only base image is an extracted container file.

9. The method of claim 1, wherein a graph driver fetches the container image, unpacks the container image creating the read-only base image, and directs the shared file system to store the files of the read-only base image.

10. The method of claim 1, wherein the file system overlay is a writeable layer.

11. The method of claim 1, wherein upon creating the file system overlay, the file system overlay is empty and all operations fall through to the read-only base image.

12. The method of claim 1, wherein copying the plurality of files and the plurality of directories from the shared file system is a background process.

13. The method of claim 12, wherein copying the plurality of files and the plurality of directories from the shared file system occurs via lazy loading.

14. The method of claim 12, wherein copying the plurality of files and the plurality of directories from the shared file system occurs immediately upon creating the file system overlay at a first rate which is lower than a second rate.

15. The method of claim 12, wherein copying the plurality of files and the plurality of directories from the shared file system occurs immediately upon creating the file system overlay at a first rate which is quicker than a second rate.

16. The method of claim 12, wherein, upon request, the copying the plurality of files and the plurality of directories from the shared file system which was occurring via lazy loading, then occurs on-demand.

17. A system comprising: one or more processors; a host executing on the one or more processors; and a shared file system, wherein the one or more processors are configured to:
    detect, from a register, that a container image is published;
    fetch, from an archive, the container image;
    unpack the container image onto a physical memory of the shared file system creating a read-only base image on the shared file system;
    copy a plurality of files and a plurality of directories into a file system overlay from the shared file system until the file system overlay is fully populated, wherein the file system overlay is fully populated when all of the files and the directories from the shared file system are copied into the file system overlay; and
    mark a completion that indicates the file system overlay is fully populated, wherein marking the completion that indicates the file system overlay is fully populated prevents accessing the read-only base image on the shared file system.

18. The system of claim 17, wherein the system includes a cluster of hosts executing on the one or more processors.

19. The system of claim 18, wherein each one of the cluster of hosts has access to the shared file system.

20. A non-transitory machine-readable medium stores code, which when executed by a processor, is configured to:
    detect, from a register, that a container image is published;
    fetch, from an archive, the container image;
    unpack the container image onto a physical memory of a shared file system creating a read-only base image on the shared file system;
    store the read-only base image on a shared file system;
    copy a plurality of files and a plurality of directories into a file system overlay from the shared file system until the file system overlay is fully populated, wherein the file system overlay is fully populated when all of the files and directories from the shared file system are copied into the file system overlay; and mark a completion that indicates the file system overlay is fully populated, wherein marking the completion that indicates the file system overlay is fully populated prevents accessing the read-only base image on the shared file system.

\* \* \* \* \*